UNITED STATES PATENT OFFICE.

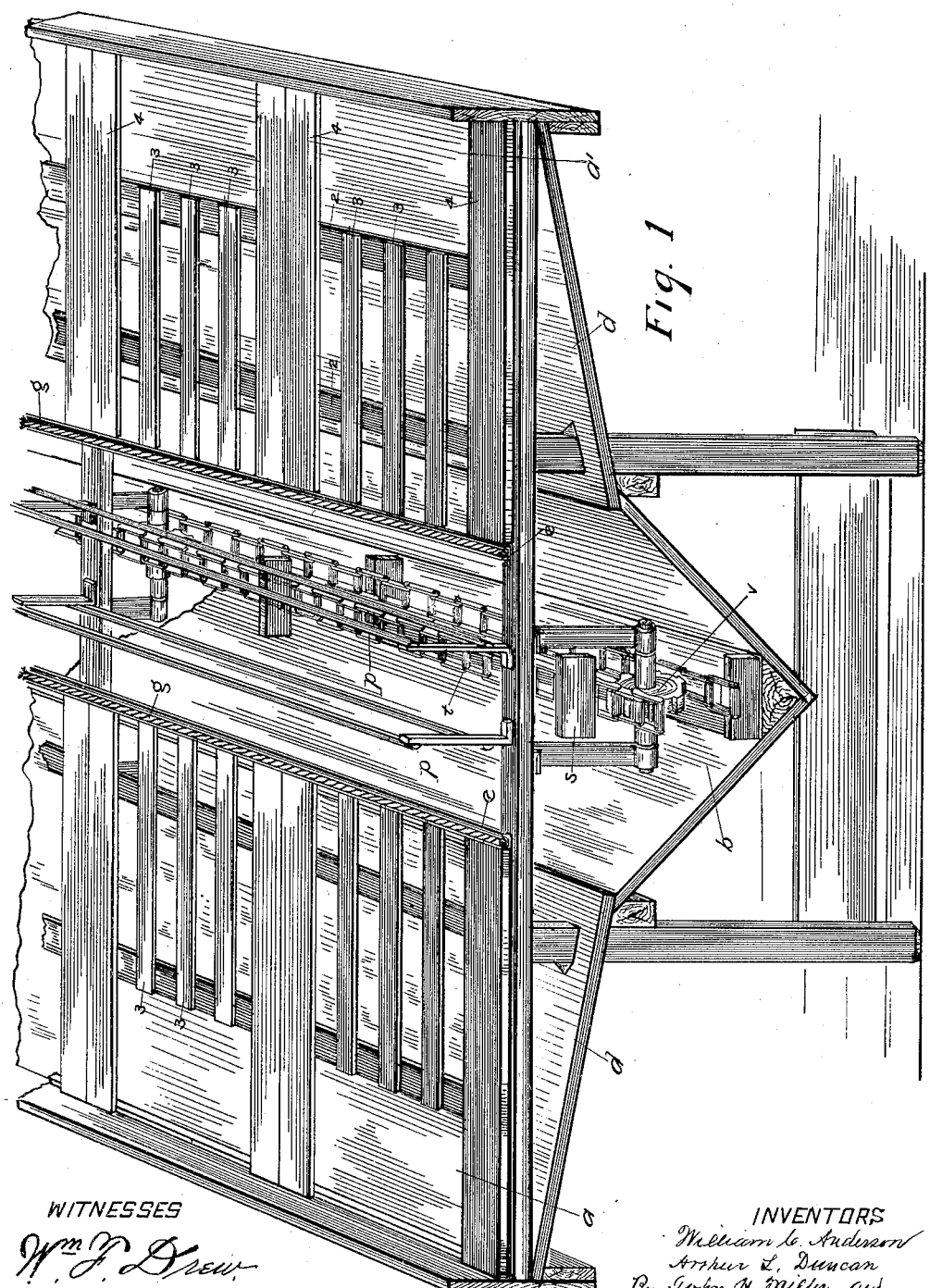

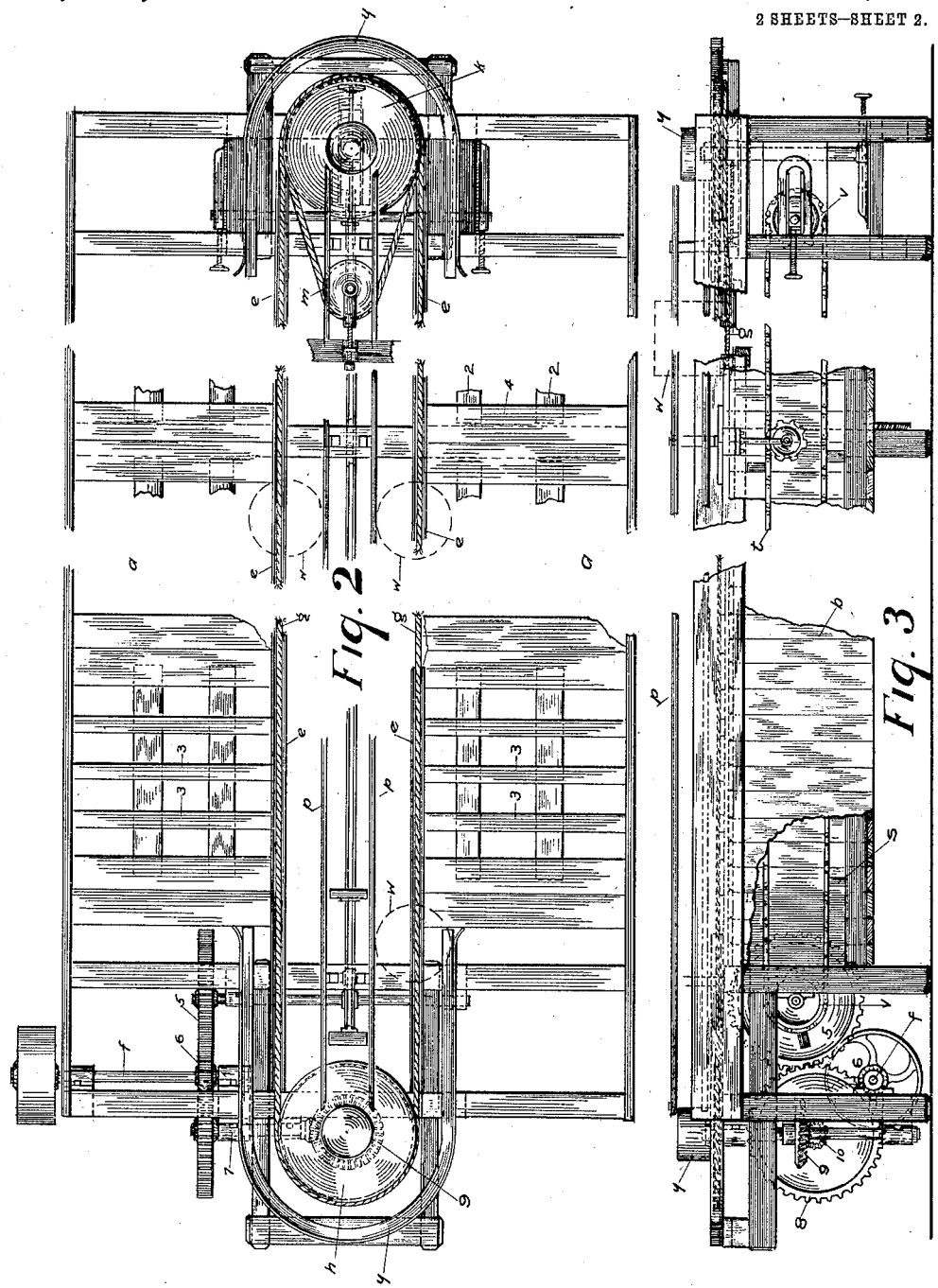

WILLIAM C. ANDERSON, OF SAN JOSE, AND ARTHUR L. DUNCAN, OF FRUITVALE, CALIFORNIA, ASSIGNORS TO ANDERSON-BARNGROVER MFG. CO., OF SANTA CLARA, CALIFORNIA, A CORPORATION OF CALIFORNIA.

FRUIT-PEELER'S TABLE.

1,006,422.   Specification of Letters Patent.   Patented Oct. 17, 1911.

Application filed August 10, 1908. Serial No. 447,917.

*To all whom it may concern:*

Be it known that we, WILLIAM C. ANDERSON, residing in San Jose, in the county of Santa Clara and State of California, and ARTHUR L. DUNCAN, residing in Fruitvale, in the county of Alameda and State of California, citizens of the United States, have invented an Improved Fruit-Peeler's Table, of which the following is a specification.

The object of this invention is the production of an improved bench or table to facilitate, and also to render more cleanly and healthy the work of peeling, cutting or otherwise preparing fresh fruits or vegetables for canning. It is especially adapted for carrying on the work on a large scale.

To such end and object chiefly it consists in a novel combination and arrangement of operators' tables; an endless traveling carrier to bring the fruit or material in position convenient to the operators and to carry it away after treatment; a stationary trough, or receptacle to catch and collect the peelings, juice and refuse; and an endless traveling conveyer for keeping the refuse matter in the trough moving toward a place of discharge or deposit, all as hereinafter more fully described and pointed out in the claims at the end of this specification.

The accompanying drawing illustrates a fruit peeler's table embodying our said invention.

Figure 1 is a view in perspective of a portion of the complete table and apparatus showing one end. Fig. 2 is a broken plan or top-view, showing the general construction and arrangement of the parts at both ends, and also an intermediate portion; intervening portions being broken away for the purpose of reducing the dimensions of the figure. Fig. 3 represents in side-elevation the parts or sections that are shown in Fig. 2.

The complete table or apparatus of our invention is designed to accommodate workmen or operators in two gangs or sets facing each other on opposite sides of an endless moving carrier by which the pails, or vessels, containing the fresh fruit are moved along between the rows of workmen, and are carried away after being peeled or otherwise prepared.

A refuse-trough between the two sets of operating tables is arranged to catch the juices and drippings and to furnish a receptacle for the parings, cores and other refuse-matter; the same being secured by extending the sides of the trough beneath the operators' tables as seen at $d$, where the sides of the trough are carried outward and upward at any angle to form the drip-boards or aprons $d$.

The matter collecting in the refuse-trough is moved and carried to the discharge-end by means of an endless conveyer arranged to travel along the bottom of the trough.

The tables $a$—$a^1$ are preferably constructed of longitudinal rails 2—2 and transverse slats 3—4, to furnish the necessary area of supporting surface for the convenience of the workmen in the operation of preparing the fruit, with as little closed or solid surfaces as possible, to retain the refuse and juices, but it is obvious that these surfaces may be composed of solid boards with openings instead of being made of slats, as we have shown and described. It should be mentioned also that the slats and their supports can be so arranged that they may be removed from the frame for cleaning, or for substituting new ones when so desired. Under the open center between the two rows of these supporting surfaces the trough $b$ extends from end to end of the tables; and its sides are carried up to within a short distance of the racks, and beneath them to the outer edge of the tables on both sides.

The drip-boards $d$ are extensions of the sides of the trough under the racks from the outer edge of which they slope downward with sufficient pitch to shed the drippings and allow the parings and pieces to slide or be readily scraped into the trough.

On both sides of the open center between the tables a grooved rail $e$ forms a stationary support against sagging for, and along which travels, an endless carrier $g$ composed of a sprocket-chain or a cable to which motion is given by connecting one of its carrying-sheaves with a power-shaft $f$, the cable $g$ being returned at the ends of the tables around carrying sheaves $h$—$k$, to one of which power is applied to move the cable. For taking up slack and regulating the tension in this cable, it is laid around an adjustable take-up sheave $m$ of well known construction, so arranged that the tension of the cable can be regulated without changing the bearings of the carrying-sheaves.

Between the tables $a$—$a^1$ and parallel with the run of the cable, fixed bars $p$—$p$ form a guide for the fruit-holding vessels, to keep the vessels properly in line and position on the cable during their travel or progressive movement. These bars are fixed along the center of the tables parallel with the run of the cable and in such relation to it that the vessels are retained in position resting on the cable and bearing on it with sufficient weight to be moved along by virtue of the frictional contact set up between the bottom of the vessel, and the upper surface of the cable. Usually the extent of contact-surface afforded by that portion of the cable which stands above the top-face of the grooved cable-guide, will be found sufficient to carry the vessel along without employing grips or mechanical means of any kind to attach or connect the vessels to the cable. To effect this engagement of the cable with the fruit-holding vessel, the fixed bars $p$—$p$ and the cable-rails $e\ e$ are arranged at the proper distance apart to bring the weight of the vessel and its load mostly upon the cable, on which the bottom of the vessel will rest while its side is touching the fixed bar $p$. This position of the vessel is indicated in Figs. 2 and 3 by the dotted lines $w$, where it will be noticed that the vessels being in contact only with the cable and the fixed bar, there is little resistance set up or interposed by the limited extent of the surface with which the vessels are in direct contact during their travel along the tables.

By the endless cable traveling continuously along one side and returning along the other side of the tables the vessels filled with the fruit are carried along between the rows of operators, who by drawing the vessels off the cable and on to the stationary table or rack are able to quickly detach a vessel from the cable and place it in convenient position to do the work which is carried on directly over the inclined dripboard; the parings and refuse and the pieces being caught by the trough, and the fruit returned to the same vessel, or to an empty one which may be provided for that purpose in the line of vessels being carried along by the cable. The filled vessels are returned to the moving line of vessels on the table by the operator, who pushes the vessel forward until it comes against the fixed support $p$ in the center of the table and with its bottom resting on the cable. The result of this arrangement of the endless traveling carrier is to facilitate the work of supplying the operators, and carrying the fruit away as soon as the same is prepared. Each workman is also enabled to regulate the supply of fruit to himself according to the degree of speed with which he is accustomed to work, without interfering with the operations of his fellow workmen, or being limited by the conditions under which they work.

In the preparation of some kinds of vegetables or other material where there is a considerable proportion of waste, or refuse the apparatus may be worked continuously, or with less frequent interruptions for cleaning up, by arranging in the trough an endless traveling conveyer, and connecting it with the power-shaft from which the endless cable is driven, so as to be moved thereby continuously through the trough from end to end. Or, if the conveyer be required to operate only at intervals, it may be connected with an operating-shaft through a clutch, or by other means that will allow it to be set in operation as often as it is desired to clean out the trough.

In the arrangement of the conveyer represented in Fig. 1, a number of scrapers $s$ on endless chain carriers $t$ are mounted in sprocket-wheels $v$ placed at opposite ends of the trough, one of the wheels $v$ being mounted in adjustable bearings as shown in Fig. 3.

Power is applied to one of the sprocket-wheels, through the medium of spur-gears 5—6 connecting it with the driving-shaft $f$ from which the cable is also operated by connecting the shaft of the cable-carrying wheel $h$ with the driving-shaft by a counter-shaft 7 and gears 8—9—10.

The addition of curved guide-rails $y$ on the ends of the table around the cable-carrying sheaves serve to keep the vessels on the cable when they reach the end of the table and are required to return on the opposite side.

In the complete apparatus of our invention, the two rows or series of tables $a$—$a^1$ which may be of indefinite length, are combined with a single carrying-cable and a single refuse collecting trough, and are designed to afford accommodation for a considerable number of operators. In an apparatus of smaller capacity, however, the tables along one side of the trough may be omitted.

We claim:—

1. A fruit peeler's table comprising a conveyer for moving fruit-holding vessels arranged to travel in a substantially horizontal plane and having two runs separated from each other and traveling respectively in opposite directions, tables at the sides of the said conveyer, a single refuse trough arranged between the tables, and a conveyer within the refuse trough moving in a substantially vertical plane and disposed between the two strands of the horizontal conveyer.

2. A fruit peeler's table comprising an endless cable for supporting and carrying fruit-containing vessels, tables at the side of the cable, and channel-like rails in which the said cable moves and by which it is supported against sagging, the cable projecting above the said rails leaving its upper portion exposed so that the fruit-containing vessels may rest directly thereon and be conveyed thereby, substantially as set forth.

3. In a fruit-peeler's table, the combination of an endless carrier for fruit-containing vessels, comprising a cable upon which the vessels may be directly seated, tables at the sides of the carrier, rails for guiding and supporting against sagging the said cable as it passes the tables, and stationary bars each arranged at such distances to one side of and above the cable that the upper parts of the vessels may rest against them when supported upon the cable, and along which the vessels are carried while being conveyed by the cable, substantially as set forth.

4. A fruit peeler's table having a refuse-trough, an inclined drip-board, a table over the drip-board, and means for moving fruit-holding vessels along the edge of the table, comprising the endless traveling cable, stationary rails on which the cable is adapted to travel, and guiding and supporting bars arranged on that side of the cable which is beyond the table and in a plane above the cable, arranged for operation substantially as set forth.

5. The combination of a refuse-trough, an endless movable conveyer in said trough, operators' tables along the sides of the trough, means for moving fruit holding vessels along the operators' tables, comprising an endless movable cable upon which the vessels may be directly set and stationary guiding and supporting bars arranged above the cable and on the sides thereof which are opposite the tables and at such distance above the cable that when the vessels are set upon the latter the upper parts of the vessels will rest against the bars, substantially as set forth.

WILLIAM C. ANDERSON.
ARTHUR L. DUNCAN.

Witnesses:
W. E. RUDELL,
EDWARD E. OSBORN.

Copies of this patent may be obtained for five cents each, by addressing the "Commissioner of Patents, Washington, D. C."